US011876313B2

(12) United States Patent
Kobayashi

(10) Patent No.: US 11,876,313 B2
(45) Date of Patent: Jan. 16, 2024

(54) CONNECTOR

(71) Applicant: HIROSE ELECTRIC CO., LTD., Kanagawa (JP)

(72) Inventor: Yuki Kobayashi, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 261 days.

(21) Appl. No.: 17/647,671

(22) Filed: Jan. 11, 2022

(65) Prior Publication Data

US 2022/0239025 A1 Jul. 28, 2022

(30) Foreign Application Priority Data

Jan. 25, 2021 (JP) ................................ 2021-009644

(51) Int. Cl.

| | |
|---|---|
| ***H01R 12/71*** | (2011.01) |
| ***H01R 13/24*** | (2006.01) |
| ***H01R 13/502*** | (2006.01) |
| ***H01R 13/405*** | (2006.01) |
| ***H01R 13/115*** | (2006.01) |

(52) U.S. Cl.

CPC ......... *H01R 12/716* (2013.01); *H01R 13/115* (2013.01); *H01R 13/24* (2013.01); *H01R 13/405* (2013.01); *H01R 13/502* (2013.01)

(58) Field of Classification Search

CPC .... H01R 12/716; H01R 13/115; H01R 13/24; H01R 13/405; H01R 13/502; H01R 12/57; H01R 12/737; H01R 13/02; H01R 13/40; H01R 12/55; H01R 12/707; H01R 13/2407

See application file for complete search history.

(56) References Cited

U.S. PATENT DOCUMENTS

| | | | | |
|---|---|---|---|---|
| 11,757,218 B2 * | 9/2023 | Hosoda | ................ | H01R 12/716 439/74 |
| 2014/0242845 A1 * | 8/2014 | Miki | .................... | H01R 12/737 439/629 |

(Continued)

FOREIGN PATENT DOCUMENTS

| | | |
|---|---|---|
| JP | 2014-164884 A | 9/2014 |
| JP | 2020-91950 A | 6/2020 |

*Primary Examiner* — Abdullah A Riyami
*Assistant Examiner* — Nelson R. Burgos-Guntin
(74) *Attorney, Agent, or Firm* — RANKIN, HILL & CLARK LLP

(57) ABSTRACT

Provided a connector including a plurality of terminals insert molded with a housing. At least one of terminals includes a first terminal portion and a second terminal portion spaced apart from the first terminal portion in a direction along a direction of mating to a counterpart connector. The first terminal portion includes a first surface extending along a plane crossing the mating direction on a side opposite to the side that mates to the counterpart connector. The first surface includes a portion that does not overlap the second terminal portion as the first and second terminal portions are viewed in the direction from the side opposite to the side that mates to the counterpart connector. At least a partial region of the portion, which does not overlap the second terminal portion, of the first surface is exposed to an outside of the housing through an opening of the housing.

8 Claims, 14 Drawing Sheets

(56) References Cited

U.S. PATENT DOCUMENTS

| | | | | |
|---|---|---|---|---|
| 2016/0164233 | A1* | 6/2016 | Zhu | H01R 24/50<br>439/248 |
| 2018/0358729 | A1* | 12/2018 | Chen | H01R 12/7088 |
| 2019/0148855 | A1* | 5/2019 | Miyazaki | H01R 12/7029<br>439/345 |
| 2020/0176909 | A1* | 6/2020 | Kobayashi | H01R 13/115 |
| 2020/0220307 | A1* | 7/2020 | Sunaga | H01R 13/6582 |
| 2020/0235506 | A1* | 7/2020 | Hosoda | H01R 12/718 |
| 2020/0328540 | A1* | 10/2020 | Miyazaki | H01R 12/73 |

* cited by examiner

CONNECTOR

CROSS-REFERENCE TO RELATED APPLICATION

This application claims priority from Japanese Patent Application No. 2021-009644 filed with the Japan Patent Office on Jan. 25, 2021, the entire content of which is hereby incorporated by reference.

BACKGROUND

1. Technical Field

The present disclosure relates to a connector.

2. Related Art

A connector is known in which an insert molded terminal is included and the direction of mating to a counterpart connector is substantially parallel to the surface of a board. For example, JP-A-2014-164884 discloses an example of a connector including insert molded terminals. In FIGS. 5 to 7 of JP-A-2014-164884, a second embodiment is an example of a connector of which direction of mating to a counterpart connector is substantially parallel to the surface of a board.

The connector of JP-A-2014-164884 includes three components: a first module, a second module, and a housing that accommodates the first and second modules. The first module is formed by insert molding a plurality of first contacts arranged in a line with a first molded portion. Similarly, the second module is formed by insert molding a plurality of second contacts arranged in a line with a second molded portion. The connector is manufactured by accommodating the first and second modules in the housing in such a manner that a contact portion of the first contact with a connection target object faces a contact portion of the second contact with a connection target object.

As disclosed also in JP-A-2020-91950, the following is well known to those skilled in the art. When the first and second contacts are insert molded with the first and second molded portions, respectively, molds are generally placed in such a manner as to sandwich predetermined portions of the first and second contacts from opposing sides (sides facing in a direction along the mating direction). During insert molding, resin is injected also into space where the mold is not present. Hence, the contacts need to be securely fixed at the predetermined portions by the mold to prevent displacement resulting from the shaking of the contacts by the injected resin.

However, as disclosed in the second embodiment of JP-A-2014-164884, the connector where the direction of mating to the counterpart connector is substantially parallel to the surface of the board and the connection portion of the first contact with the connection target object on the first module and the connection portion of the second contact with the connection target object on the second module are placed in such a manner as to face each other has the following problems: The above connector has a portion where the first and second contacts overlap (which may hereinafter be referred to as the contact overlapping portion, or the overlapping portion) as viewed in a direction along the mating direction. Hence, it is impossible or difficult to place a mold for each of the first and second contacts. In other words, it is impossible or difficult to insert mold the first and second contacts with the first and second molded portions, respectively, at the same time. Hence, although not expressly stated, it is conceivable that the connector of JP-A-2014-164884 has adopted a complicated manufacturing method that accommodates the first and second modules in the housing after the first and second contacts are insert molded with the first and second modules, respectively and separately.

In this manner, in order to manufacture a connector having the contact overlapping portion as viewed in the direction along the mating direction, that is, the direction along the mold placement direction, such as disclosed in JP-A-2014-164884, complicated work is required, and the number of molds that are required increases. Hence, there are problems that productivity decreases and manufacturing costs increase.

SUMMARY

A connector according to embodiments of the present disclosure is configured as follows. The connector includes: a housing; and a plurality of terminals insert molded with the housing. At least one of the plurality of terminals includes a first terminal portion, and at least one of the plurality of terminals includes a second terminal portion spaced apart from the first terminal portion in a direction along a direction of mating to a counterpart connector. The first terminal portion is placed on a side nearer to a side that mates to the counterpart connector than the second terminal portion in the direction along the mating direction, and the first terminal portion includes a first surface extending along a plane crossing the mating direction on a side opposite to the side that mates to the counterpart connector in the mating direction. The first surface includes a portion that does not overlap the second terminal portion as the first and second terminal portions are viewed in the direction along the mating direction from the side opposite to the side that mates to the counterpart connector in the mating direction. At least a partial region of the portion, which does not overlap the second terminal portion, of the first surface is exposed to an outside of the housing through an opening of the housing.

DETAILED DESCRIPTION

Figure 1:
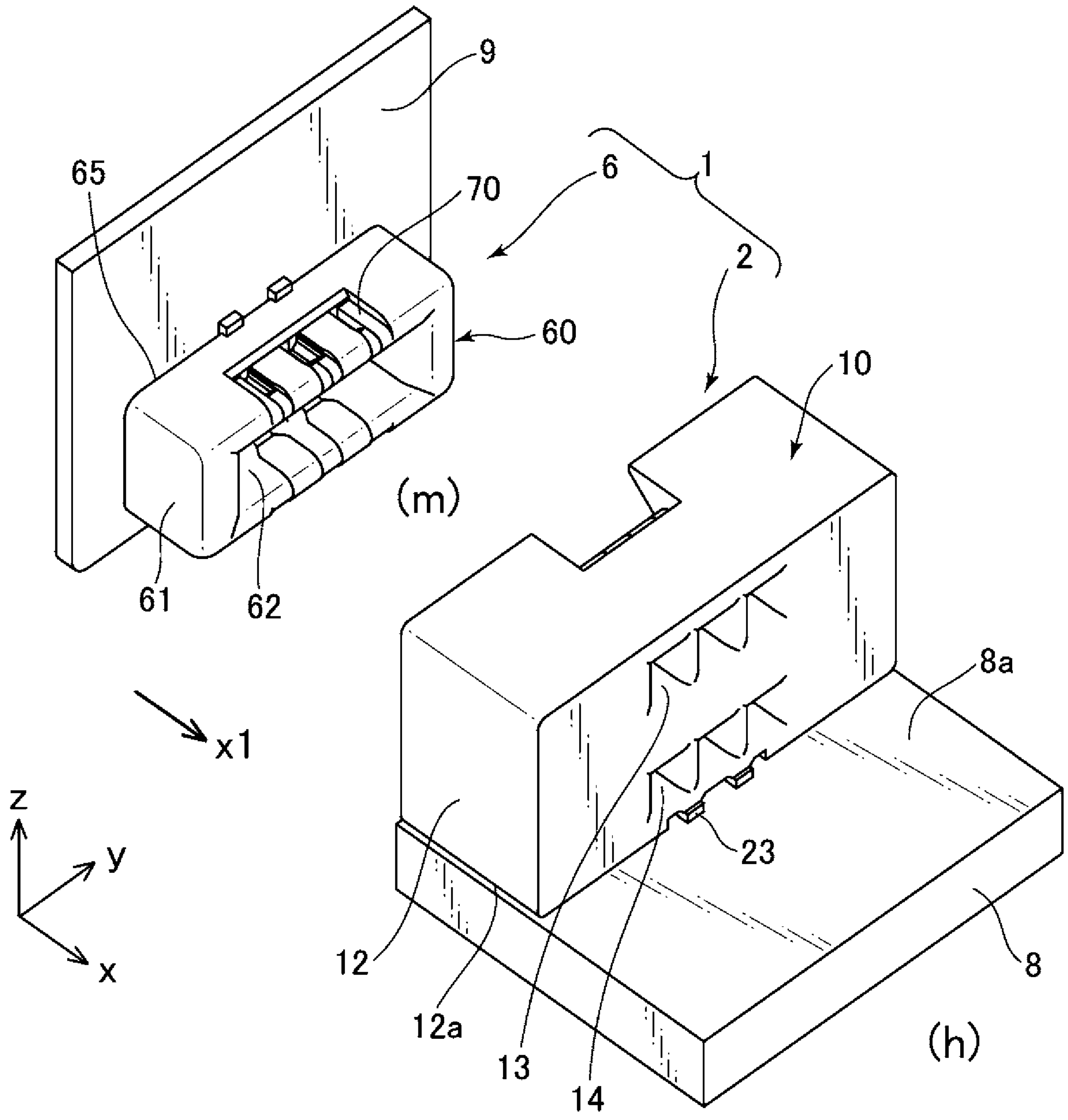
FIG. 1 is a perspective view of a connector apparatus including a connector according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a connector that solves the problems of the above-mentioned technologies for a connector including an insert molded terminal. In other words, an object is to provide a connector including an insert molded terminal, and a contact overlapping portion as viewed in a direction along a mating direction, the connector allowing increasing productivity and decreasing manufacturing costs as compared to before.

The above problems of a connector that productivity decreases and manufacturing costs increase are not limited to a case where the direction of mating to a counterpart connector is substantially parallel to the surface of a board, such as disclosed in the second embodiment of JP-A-2014-164884, but can also occur in a case where the direction of mating to a counterpart connector is substantially vertical to the surface of a board. Moreover, the above problems can occur not only in a case where there is a plurality of contacts but even in a case where there is only one contact if the contact is configured to have the above-mentioned overlapping portion. In other words, the present disclosure solves problems of all connectors where similar problems can occur, regardless of whether the direction of mating to a counterpart connector is substantially parallel or substantially vertical, and regardless of whether the number of contacts is one, or two or more.

In order to solve the above problems, a connector according to one embodiment of the present disclosure includes: a housing; and a plurality of terminals insert molded with the housing. At least one of the plurality of terminals includes a first terminal portion, and at least one of the plurality of terminals includes a second terminal portion spaced apart from the first terminal portion in a direction along a direction of mating to a counterpart connector. The first terminal portion is placed on a side nearer to a side that mates to the counterpart connector than the second terminal portion in the direction along the mating direction, and the first terminal portion includes a first surface extending along a plane crossing the mating direction on a side opposite to the side that mates to the counterpart connector in the mating direction. The first surface includes a portion that does not overlap the second terminal portion as the first and second terminal portions are viewed in the direction along the mating direction from the side opposite to the side that mates to the counterpart connector in the mating direction. At least a partial region of the portion, which does not overlap the second terminal portion, of the first surface is exposed to an outside of the housing through an opening of the housing.

The connector according to this aspect is configured in such a manner that at least a part of the first surface of the first terminal portion does not overlap the second terminal portion as the first and second terminal portions are viewed from the side opposite to the mating side in the direction of mating to the counterpart connector, and that at least the partial region of the portion that does not overlap is exposed to the outside of the housing through the opening of the housing. Hence, the connector can be manufactured, pressing at least the exposed partial region with a mold. Therefore, even a connector having the contact overlapping portion can be easily manufactured, and the manufacturing costs of the connector can be reduced.

According to the present disclosure, even a type of connector having the contact overlapping portion as viewed in the direction along the mating direction can be easily manufactured, and the manufacturing costs can be reduced.

Illustrative embodiments for carrying out the present disclosure are described in detail hereinafter with reference to the drawings. However, for example, the dimensions, the materials, the shapes, and the relative positions of constituent elements, which are described in the following embodiments, are arbitrary, and can be modified in accordance with the configuration of an apparatus to which the present disclosure is applied, or various conditions. Moreover, the scope of the present disclosure is not limited to the specific embodiments described below unless otherwise specified.

FIG. 1 is a perspective view of a connector apparatus 1 including a connector (receptacle connector 2) according to a first embodiment. The connector apparatus 1 includes a pair of the receptacle connector 2 being the connector of the present disclosure, and a plug connector (counterpart connector) 6 that can mate to the receptacle connector 2. FIG. 1 illustrates a state before the receptacle connector 2 and the plug connector 6 are mated together as a board-to-board connector.

The receptacle connector 2 is fixed to a relatively rigid resin board 8. On the other hand, the plug connector 6 is fixed to a flexible board 9 such as an FPC. In this case, the plug connector 6 fixed to the board 9 can mate to the receptacle connector 2 fixed to the board 8 relatively easily. In this example, the receptacle connector 2 is formed as what is called a right-angle connector, and when the receptacle connector 2 and the plug connector 6 are mated together, the boards 8 and 9 are located substantially orthogonal to each other. In other words, a direction (x1) in which the plug connector 6 mates to the receptacle connector 2 is set in such a manner as to be substantially parallel to a board surface *8a* of the board 8 to which the receptacle connector 2 is fixed. However, as is clear from the following description, the receptacle connector 2 is not necessarily a right-angle connector. Moreover, the receptacle connector 2 and the plug connector 6 are not necessarily a board-to-board connector, either.

The plug connector 6, which is the counterpart connector, includes a housing 60, and a plurality of terminals 70, which are counterpart terminals and provided to the housing 60.

The housing 60 includes a substantially rectangular peripheral wall 61 protruding toward a side that mates to the receptacle connector 2, a bottom portion 65 that is fixed to the board 9 via the terminals 70 mounted on the board 9, and a mating recess 62 formed by the peripheral wall 61 and the bottom portion 65. The plug connector 6 is simply required to have a shape that can mate to the receptacle connector 2, and may have, for example, a shape similar to a plug connector that is conventionally used. The housing 60 is fixed to the board 9 by, for example, soldering the terminals 70 to the board 9.

Figure 2:
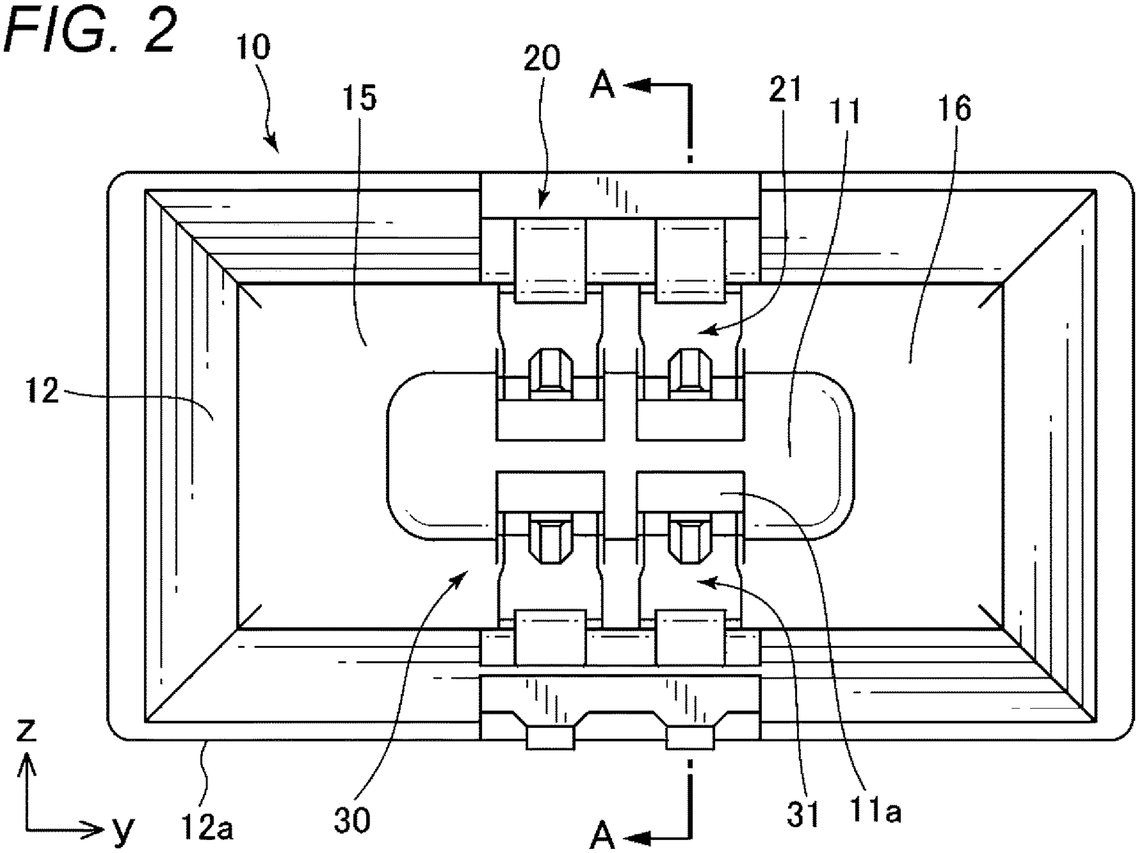
FIG. 2 is a front view of the connector according to the first embodiment.

FIG. 2 illustrates a front view of the receptacle connector 2. The receptacle connector 2 includes a housing 10 and a plurality of terminals insert molded with the housing 10. In the example illustrated in FIG. 2, the receptacle connector 2 includes two types of terminals 20 and 30, two per each type. However, as is clear from the following description, the number of terminals is not limited to the number mentioned above upon carrying out the present disclosure. The receptacle connector 2 may include one, or three or more, per each type of terminals 20 and 30, or include one or more terminals 20 alone. The housing 10 is fixed to the board 8 by, for example, soldering the terminals 20 and 30 to the board 8.

The housing 10 includes an island portion 11 protruding toward a side that mates to the plug connector 6, a frame-shaped peripheral wall 12 that surrounds the outer periphery of the island portion 11, and a support wall 15 that supports the bottom portions of the island portion 11 and the peripheral wall 12. A mating recess 16 is formed in a space between the island portion 11 and the peripheral wall 12. A portion of the mating recess 16 on a side opposite to the mating side is closed by the support wall 15. When the receptacle connector 2 and the plug connector 6 are mated together, the island portion 11 of the receptacle connector 2 fits in the mating recess 62 of the plug connector 6 while the peripheral wall 61 of the plug connector 6 fits in the mating recess 16 of the receptacle connector 2.

Figure 3:
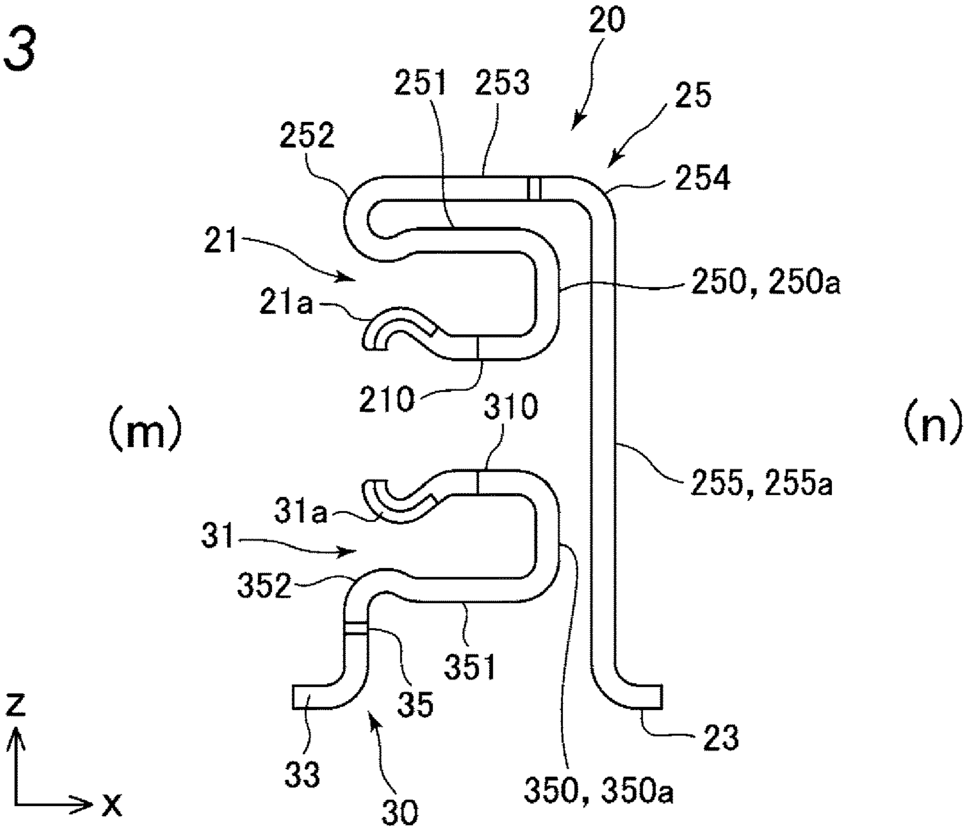
FIG. 3 is a side view of terminals according to the first embodiment.
Figure 4:
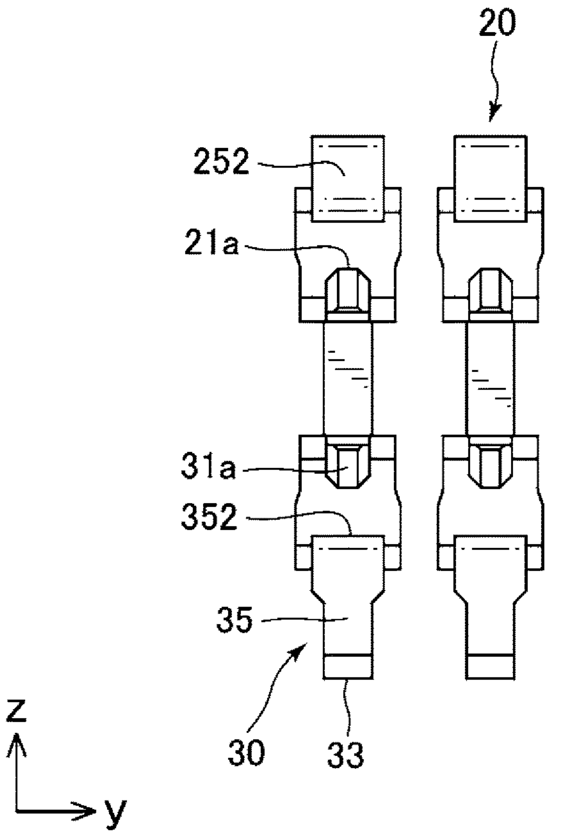
FIG. 4 is a front view of the terminals of FIG. 3.
Figure 5:
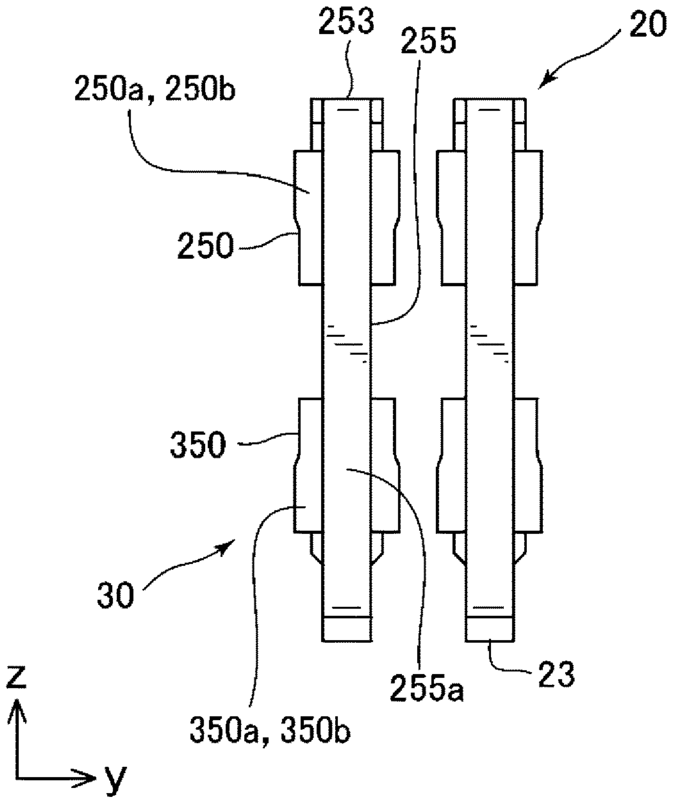
FIG. 5 is a rear view of the terminals of FIG. 3.

FIGS. 3, 4, and 5 illustrate a side view, a front view, and a rear view of the terminals 20 and 30, respectively. FIGS. 3 to 5 illustrate an arranged state of the terminals 20 and 30 that have been fixed to the housing 10.

The terminal 20 includes a substantially U-shaped portion 21, a board mounted portion 23 that is mounted on the board 8, and a middle portion 25 extending between the substantially U-shaped portion 21 and the board mounted portion 23. A part of the peripheral wall 61 of the terminals 70 of the plug connector 6 is inserted into the substantially U-shaped portion 21 when the receptacle connector 2 and the plug connector 6 are mated together.

The substantially U-shaped portion 21 includes, at one end, an elastic displacement portion 210 having a contact 21*a* that can elastically come into contact with any of portions of the terminal 70 of the plug connector 6, and a first vertical portion 250 and a first horizontal portion 251 that support the elastic displacement portion 210 in such a manner as to be elastically displaceable. The first horizontal portion 251 extends in a horizontal direction (x) to the board 8. On the other hand, the first vertical portion 250 extends in a vertical direction (z) to the board surface 8*a*.

The middle portion 25 includes a second horizontal portion 253, a second vertical portion 255, and a bent portion 254 that has approximately a right angle in side view and links one ends of the second horizontal portion 253 and the second vertical portion 255. The second horizontal portion 253 extends in the horizontal direction (x) to the board 8 as in the first horizontal portion 251. The second vertical portion 255 extends in the vertical direction (z) to the board surface 8*a* as in the first vertical portion 250. The other end of the second horizontal portion 253 is connected to the other end of the substantially U-shaped portion 21 via a curved portion 252. The curved portion 252 is folded back approximately 180 degrees in side view. The second vertical portion 255 is placed on a side (n) farther from the side that mates to the plug connector 6 than the first vertical portion 250 in the direction (x) along the mating direction.

The board mounted portion 23 is provided at the other end of the second vertical portion 255. The board mounted portion 23 is placed on the side (n) farther from the side that mates to the plug connector 6 than the second vertical portion 255 in the direction (x) along the mating direction.

On the other hand, the terminal 30 includes a substantially U-shaped portion 31, a board mounted portion 33 that is mounted on the board 8, and a middle portion 35 extending between the substantially U-shaped portion 31 and the board mounted portion 33. A part of the peripheral wall 61 of the terminals 70 of the plug connector 6 can be inserted into the substantially U-shaped portion 31 when the receptacle connector 2 and the plug connector 6 are mated together.

The substantially U-shaped portion 31 includes, at one end, an elastic displacement portion 310 having a contact 31*a* that can elastically come into contact with any of portions of the terminal 70 of the plug connector 6, and a first vertical portion 350 and a first horizontal portion 351 that support the elastic displacement portion 310 in such a manner as to be elastically displaceable. The first horizontal portion 351 extends in the horizontal direction (x) to the board 8. On the other hand, the first vertical portion 350 extends in the vertical direction (z) to the board surface 8*a* on a side (m) nearer to the side that mates to the plug connector 6 than the second vertical portion 255 in the direction (x) along the mating direction.

The middle portion 35 is formed as a portion extending in the vertical direction (z) to the board surface 8*a*. One end of the middle portion 35 is connected to the other end of the substantially U-shaped portion 31 via a curved portion 352.

The board mounted portion 33 is provided at the other end of the middle portion 35. The board mounted portion 33 is placed on the side (m) nearer to the side that mates to the plug connector 6 than the first vertical portion 350 in the direction (x) along the mating direction.

When the terminals 20 and 30 are fixed to the housing 10, the contact 21*a* of the terminal 20 and the contact 31*a* of the terminal 30 are located in stages, spaced apart from each other in the vertical direction (z) to the board surface 8*a*. In other words, the contact 21*a* is located at a position farther away from the board 8 than the contact 31*a* in the vertical direction (z) to the board surface 8*a*. The island portion 11 of the housing 10 is provided with displacement spaces 11*a* to accommodate the displacement of the elastic displacement portions 210 and 310 including the contacts 21*a* and 31*a*.

Figure 6:
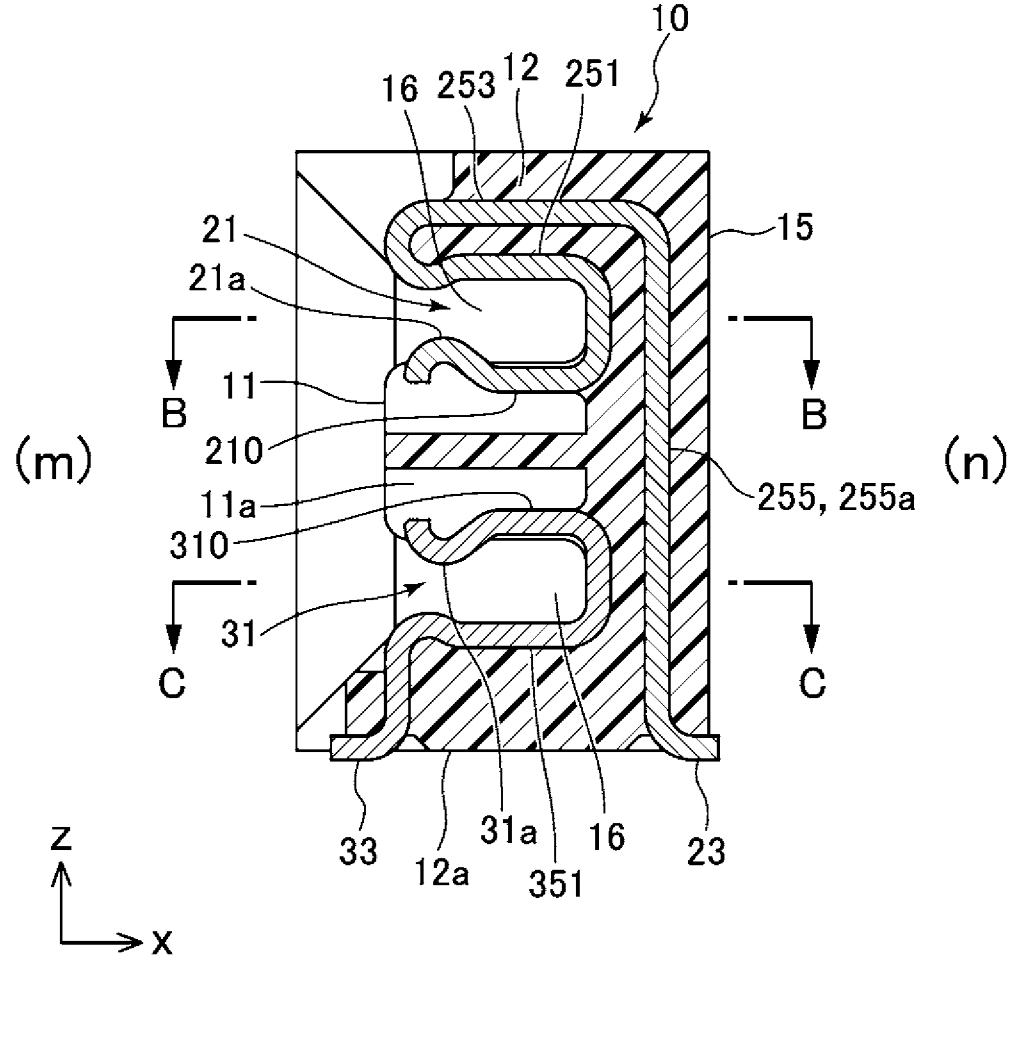
FIG. 6 is a cross-sectional view along line A-A in FIG. 2.
Figure 7:
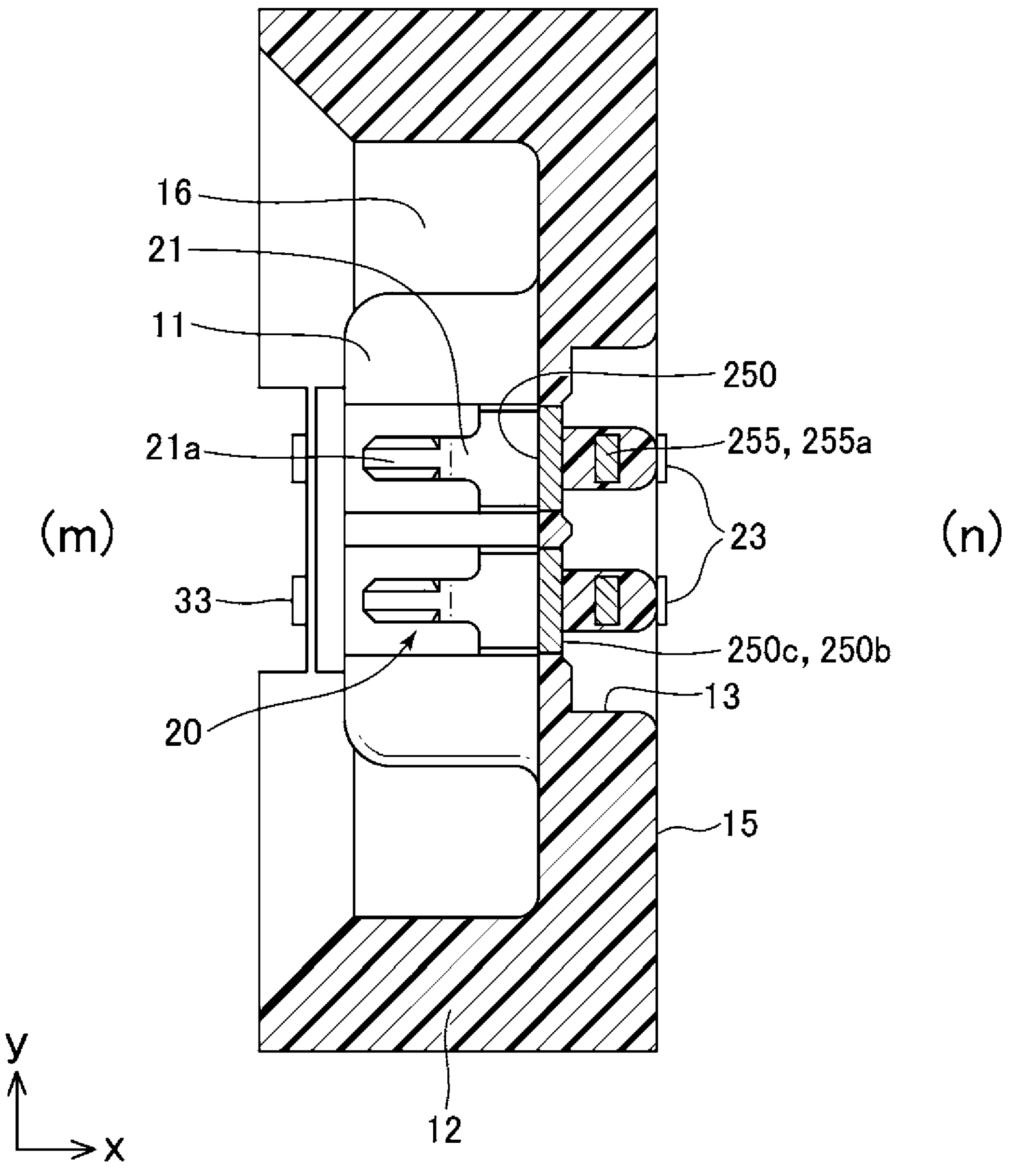
FIG. 7 is a cross-sectional view along line B-B in FIG. 6.
Figure 8:
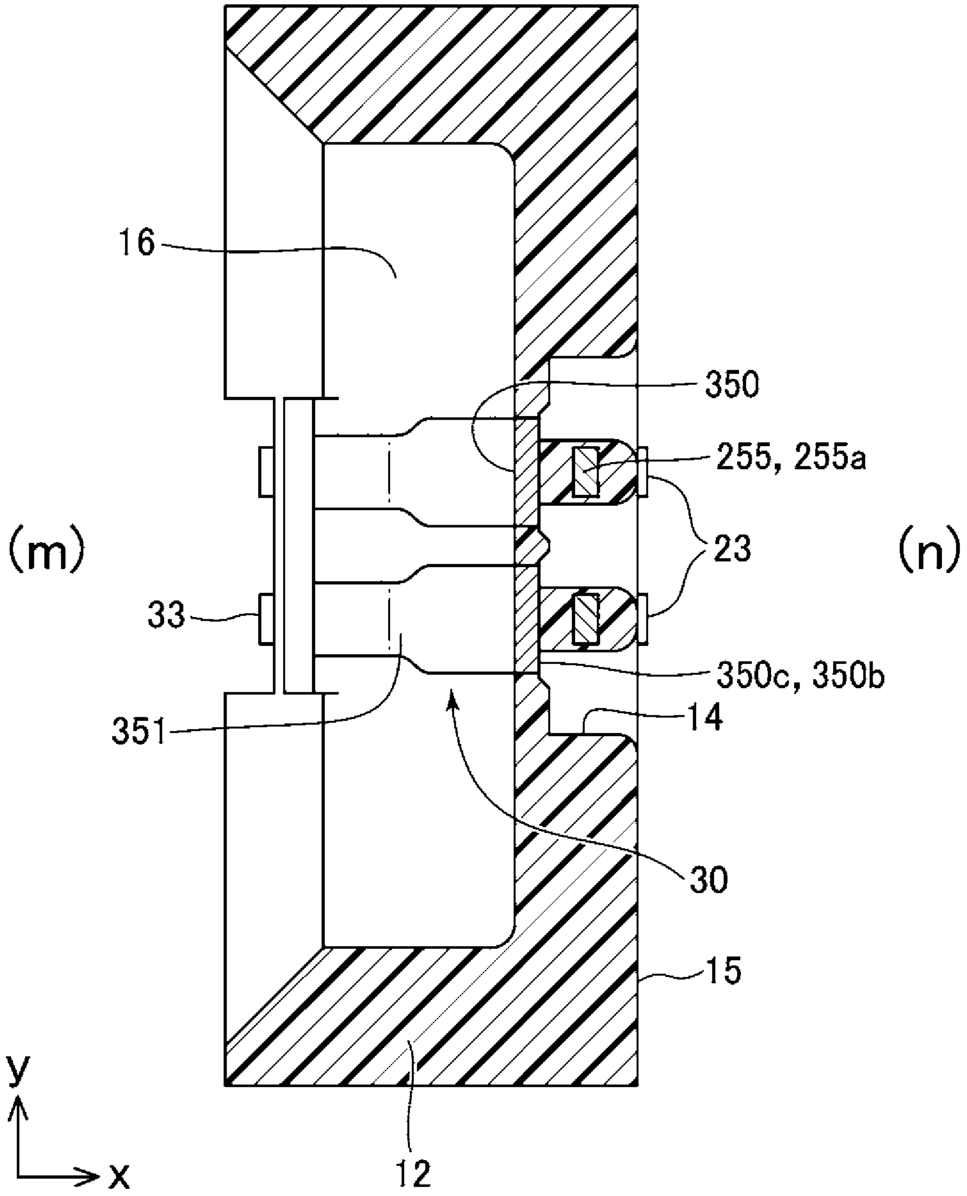
FIG. 8 is a cross-sectional view along line C-C in FIG. 6.

FIGS. 6, 7, and 8 illustrate a cross-sectional view along line A-A in FIG. 2, a cross-sectional view along line B-B in FIG. 6, and a cross-sectional view along line C-C in FIG. 6, respectively.

The terminals 20 and 30 are fixed by being insert molded with the housing 10. At least any of portions of each of the terminals 20 and 30 is embedded in the housing 10. However, the terminals 20 and 30 are still exposed partially, that is, on the side (m) that mates to the plug connector 6 in a mating direction (x1), to the outside of the housing 10 after the terminals 20 and 30 are insert molded with the housing 10. For example, a portion that can come into contact with the terminal 70 of the plug connector 6 upon mating is exposed to the outside of the housing 10 as in the elastic displacement portions 210 and 310. Moreover, parts of the terminals 20 and 30, that is, the board mounted portions 23 and 33 that are soldered to the board 8, and parts of the first vertical portion 250 of the terminal 20 and of the first vertical portion 350 of the terminal 30 are also exposed to the outside of the housing 10 on the side (n) opposite to the side that mates to the plug connector 6 in the mating direction (x1). Especially a partial region 250*c* of a first surface 250*a* and a partial region 350*c* of a first surface 350*a*, which extend along a plane (a y-z plane) crossing the mating direction (x1), remain exposed to the outside of the housing 10.

The exposed portions of the first vertical portions 250 and 350 are described in more detail. In the following description, in addition to the first vertical portion (a first terminal portion) 250 of the terminal 20 and the first vertical portion (a first terminal portion) 350 of the terminal 30, the second vertical portion (a second terminal portion) 255 of the terminal 20 is described.

The first vertical portions 250 and 350 and the second vertical portion 255 include the first surfaces 250*a* and 350*a* and a second surface 255*a* that extend along the plane (the y-z plane) crossing the mating direction (x1), respectively, on the side (n) opposite to the side that mates to the plug connector 6 in the mating direction (x1).

At least parts (250*b* and 350*b*) of the first surfaces 250*a* and 350*a* do not overlap the second vertical portion 255 as the first vertical portions 250 and 350 and the second vertical portion 255 are viewed in the direction (x) along the mating direction (x1) from the side (n) opposite to the side that mates the plug connector 6 in the mating direction (x1) (refer to FIG. 5). As a result, at least the partial regions 250*c* and 350*c* (refer to FIGS. 7 and 8) of the portions 250*b* and 350*b* that do not overlap the second vertical portion 255 can be made exposed to the outside of the housing 10 through a first opening 13 (refer to FIGS. 7 and 1) and a second opening 14 (refer to FIGS. 8 and 1) that are provided to the housing 10, respectively. As is clear from the drawings, at least the partial regions 250*c* and 350*c* exposed to the outside are provided by setting the areas of the first surfaces 250*a* and 350*a* larger than the area of the second vertical portion 255 on at least the plane (the y-z plane) crossing the mating direction (x1).

In this manner, in the receptacle connector 2 with the present configuration, at least the partial regions 250*c* and 350*c* of the first surfaces 250*a* and 350*a* of the first vertical portions 250 and 350 can be made exposed to the outside of the housing 10 through the first opening 13 and the second opening 14 that are provided to the housing 10. Hence, the terminals 20 and 30 can be pressed with a mold (not illustrated) in the predetermined regions 250*c* and 350*c* of the first surfaces 250*a* and 350*a*. Consequently, it is possible to perform insert molding in a stable state without displacement of the terminals due to the injected resin.

A second embodiment is described with reference to FIGS. 9 to 13. The second embodiment is similar to the first embodiment in respects that are not specified. In FIGS. 9 to 13, the same reference numerals with a letter "A" are assigned to members similar or corresponding to those in the first embodiment.

Figure 9:
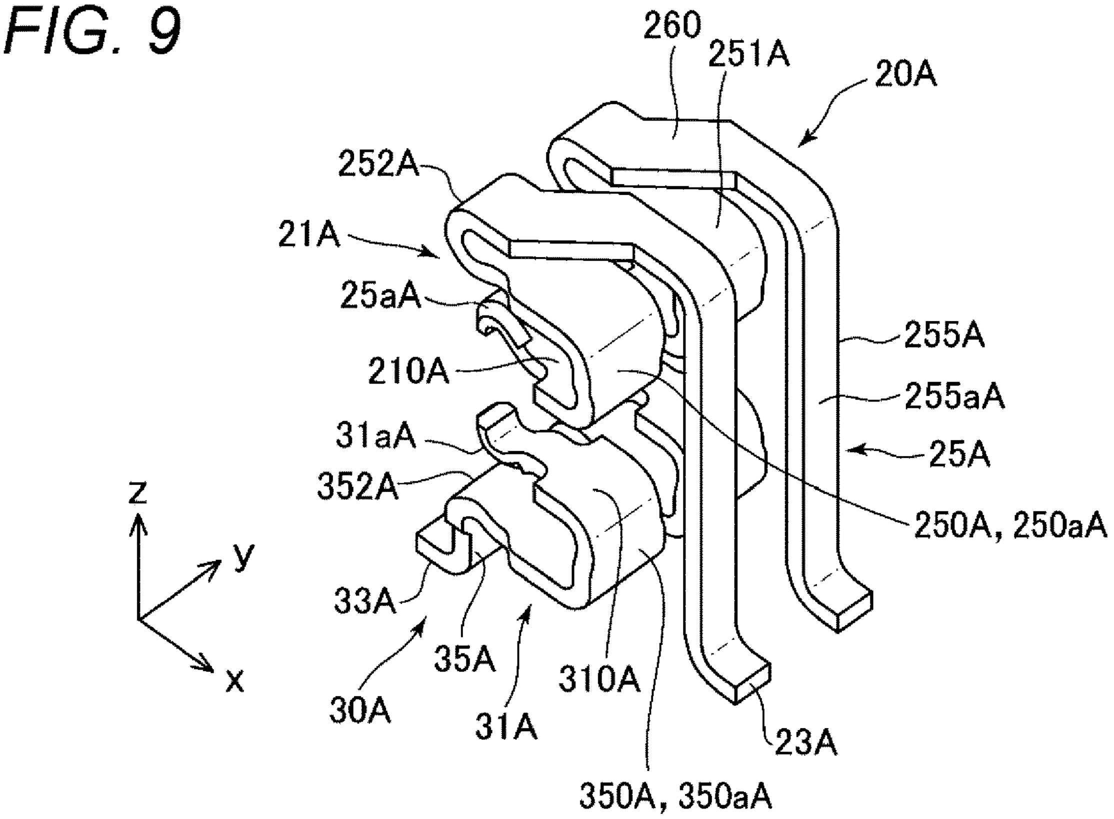
FIG. 9 is a perspective view of terminals according to a second embodiment.
Figure 10:
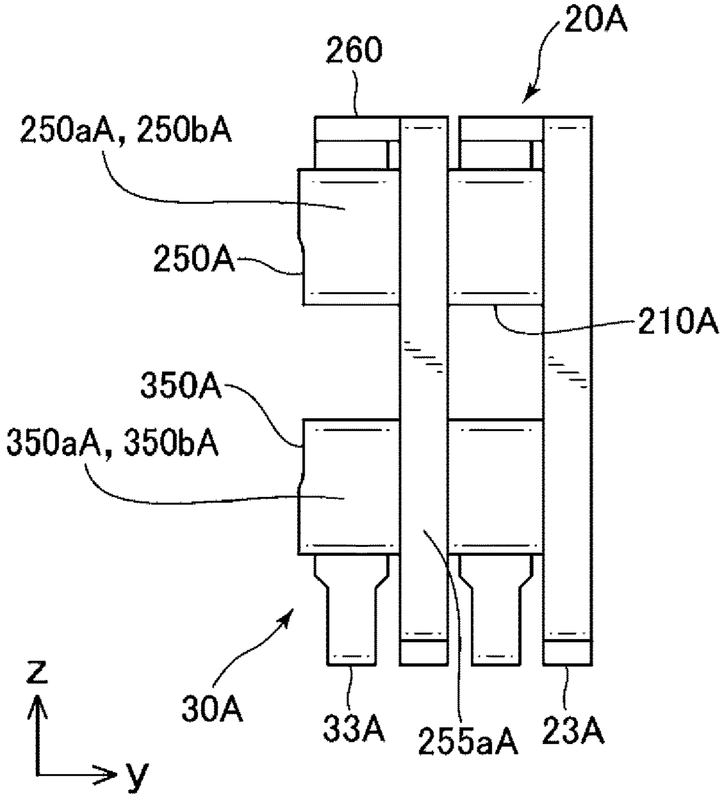
FIG. 10 is a rear view of the terminals of FIG. 9.
Figure 11:
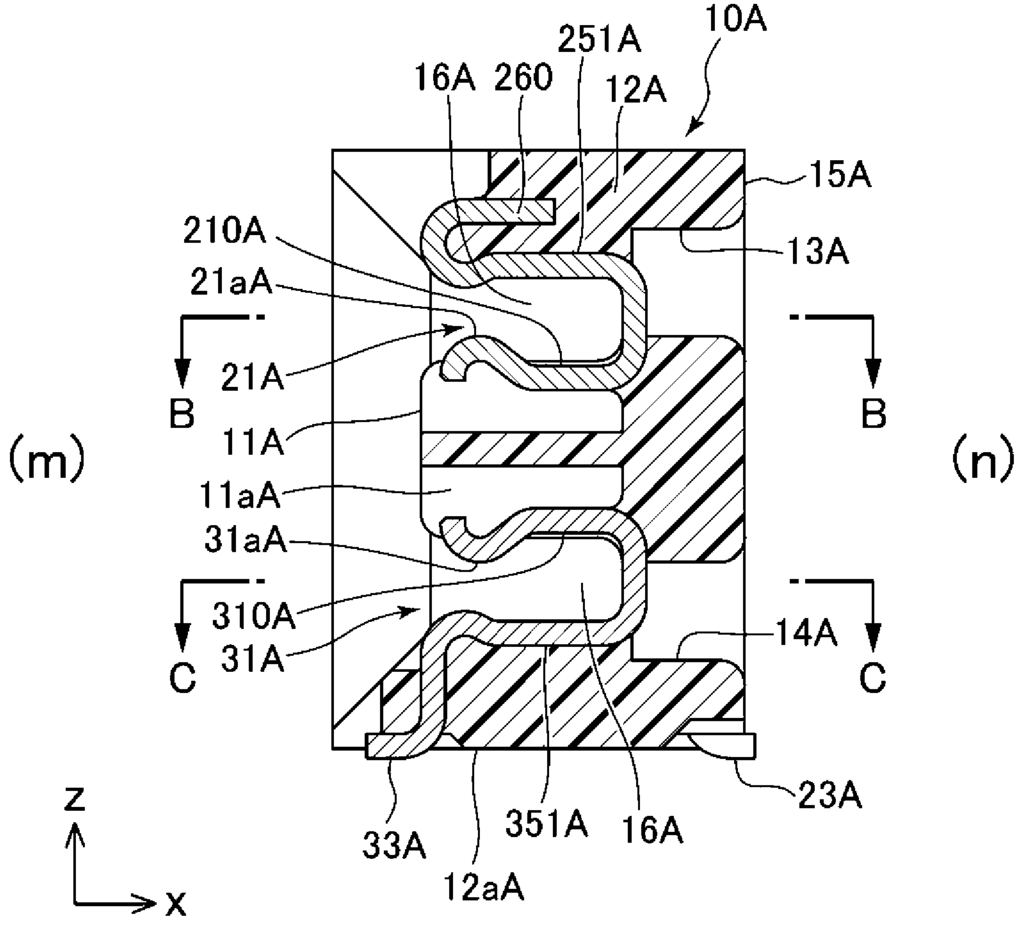
FIG. 11 is a cross-sectional view of the terminals according to the second embodiment, corresponding to the cross-sectional view along line A-A in FIG. 2 in the first embodiment.
Figure 12:
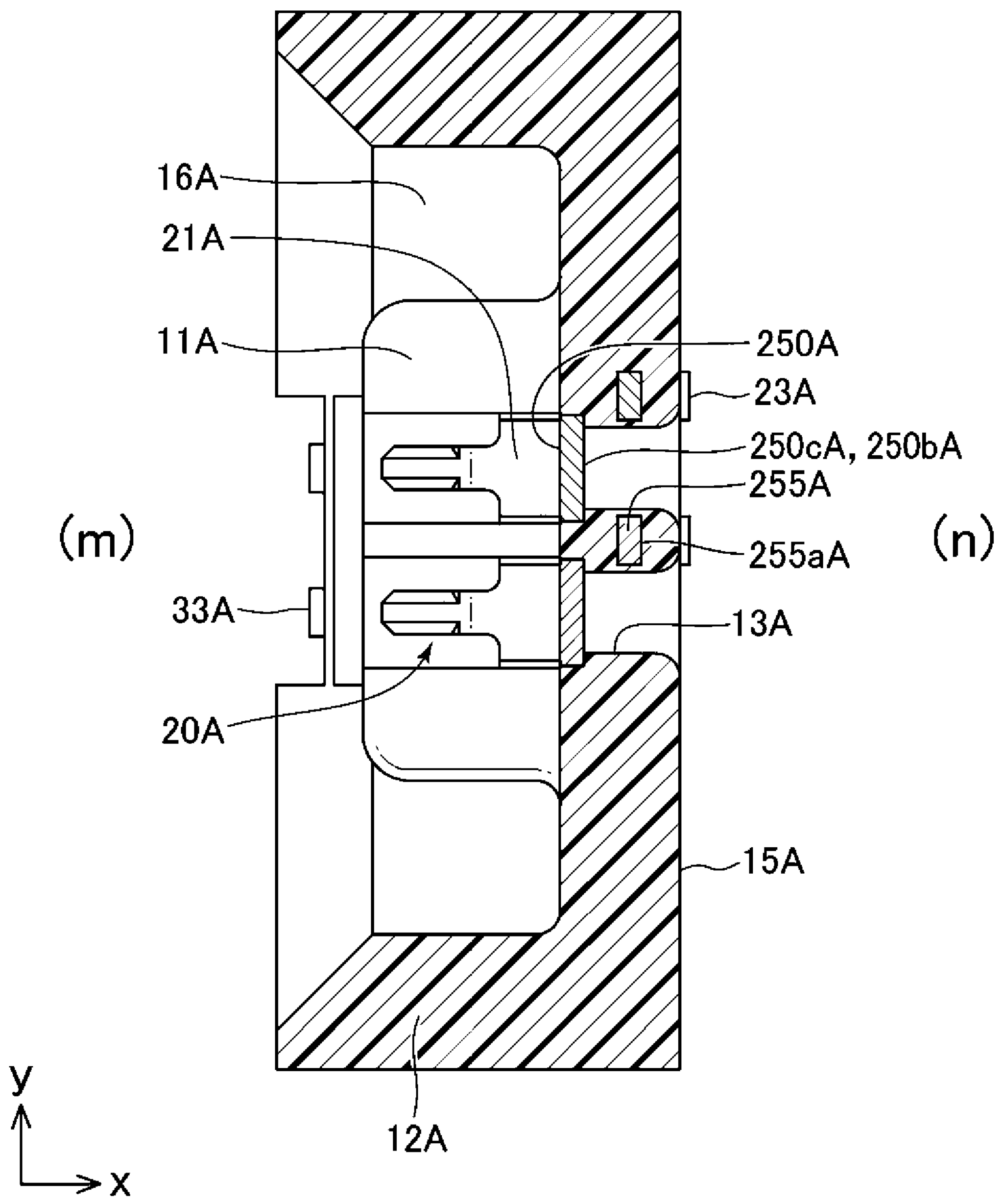
FIG. 12 is a cross-sectional view of the terminals according to the second embodiment, corresponding to the cross-sectional view along line B-B in FIG. 6 in the first embodiment.
Figure 13:
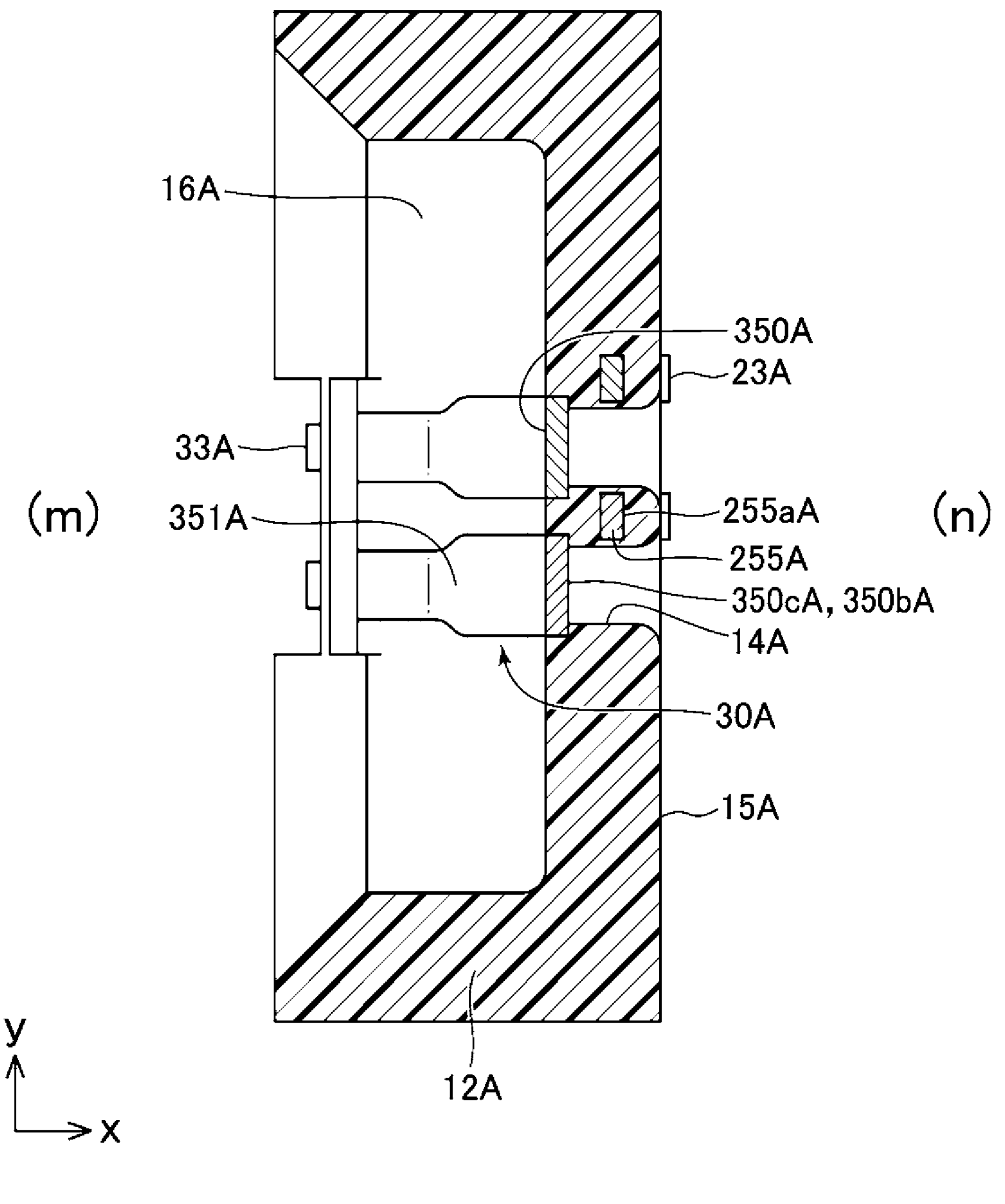
FIG. 13 is a cross-sectional view of the terminals according to the second embodiment, corresponding to the cross-sectional view along line C-C in FIG. 6 in the first embodiment.

FIGS. 9 and 10 illustrate a perspective view and a rear view of terminals, respectively. Moreover, FIGS. 11, 12, and 13 illustrate a cross-sectional view corresponding to the cross-sectional view along line A-A in FIG. 2 in the first embodiment, a cross-sectional view corresponding to the cross-sectional view along line B-B in FIG. 6 in the first embodiment, and a cross-sectional view corresponding to the cross-sectional view along line C-C in FIG. 6, respectively.

A terminal 20A includes a substantially U-shaped portion 21A, a board mounted portion 23A that is mounted on the board 8, and a middle portion 25A extending between the substantially U-shaped portion 21A and the board mounted portion 23A as in the terminal 20 in the first embodiment.

Among them, the substantially U-shaped portion 21A and the board mounted portion 23A in the second embodiment have the same configurations as those in the first embodiment. In contrast, the middle portion 25A in the second embodiment includes an inclined portion 260 obtained by obliquely inclining the path on an x-y plane in the direction (x) along the mating direction. In this respect, the configuration of the second embodiment is different from that of the first embodiment. In other words, in the second embodiment, the inclined portion 260 is provided to make adjustments in such a manner as to prevent the substantially U-shaped portion 21A and a second vertical portion 255A from overlapping on the plane (the y-z plane) crossing the mating direction (x1) as viewed in the direction (x) along the mating direction. A terminal 30A has the same configuration as that of the terminal 30 in the first embodiment.

In the second embodiment, especially at least parts (250*b*A and 350*b*A) of first surfaces 250*a*A and 350*a*A, which extend along the plane (the y-z plane) crossing the mating direction, of a first vertical portion 250A of the terminal 20A and of a first vertical portion 350A of the terminal 30A do not overlap the second vertical portion 255A as viewed in the direction (x) along the mating direction (refer to FIG. 10). As a result, at least partial regions 250*c*A (refer to, for example, FIG. 12) and 350*c*A (refer to, for example, FIG. 13) of the portions 250*b*A and 350*b*A that do not overlap the second vertical portion 255A can be used to place a mold through a first opening 13A and a second opening 14A, respectively. The main difference from the first embodiment is the respect that, in the second embodiment, the partial regions 250*c*A and 350*c*A are provided as the regions that is used to place a mold, by displacing the first vertical portions 250A and 350A from the second vertical portion 255A at least on the plane (the y-z plane) crossing the mating direction (x1).

A third embodiment is described with reference to FIGS. 14 to 18. The third embodiment is similar to the first embodiment in respects that are not specified. In FIGS. 14 to 18, the same reference numerals with a letter "B" are assigned to members similar or corresponding to those in the first embodiment.

Figure 14:
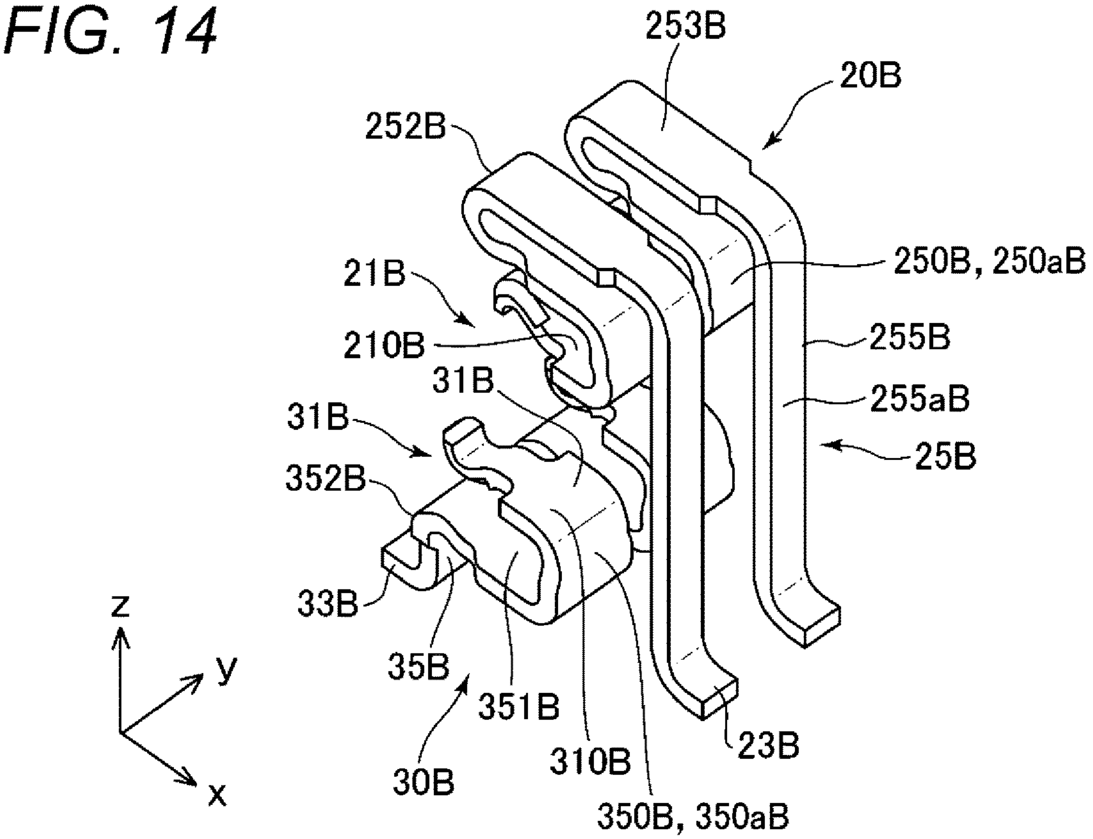
FIG. 14 is a perspective view of terminals according to a third embodiment.
Figure 15:
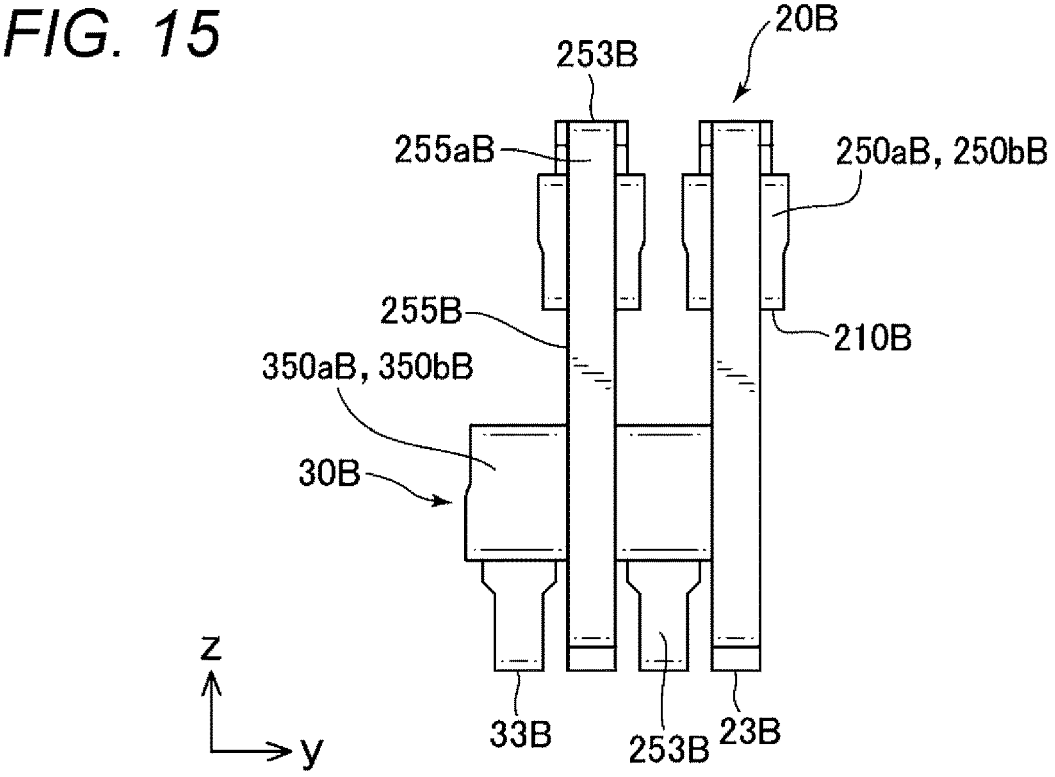
FIG. 15 is a rear view of the terminals of FIG. 14.
Figure 16:
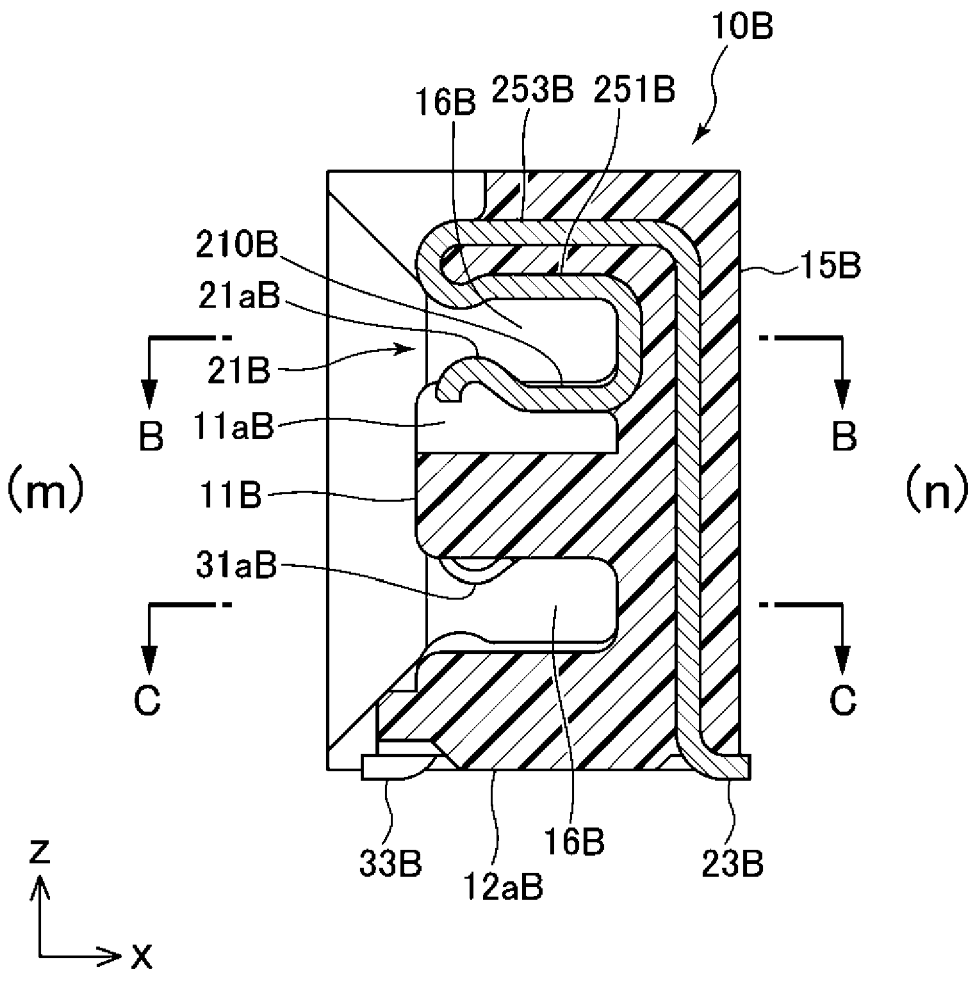
FIG. 16 is a cross-sectional view of the terminals according to the third embodiment, corresponding to the cross-sectional view along line A-A in FIG. 2 in the first embodiment.
Figure 17:
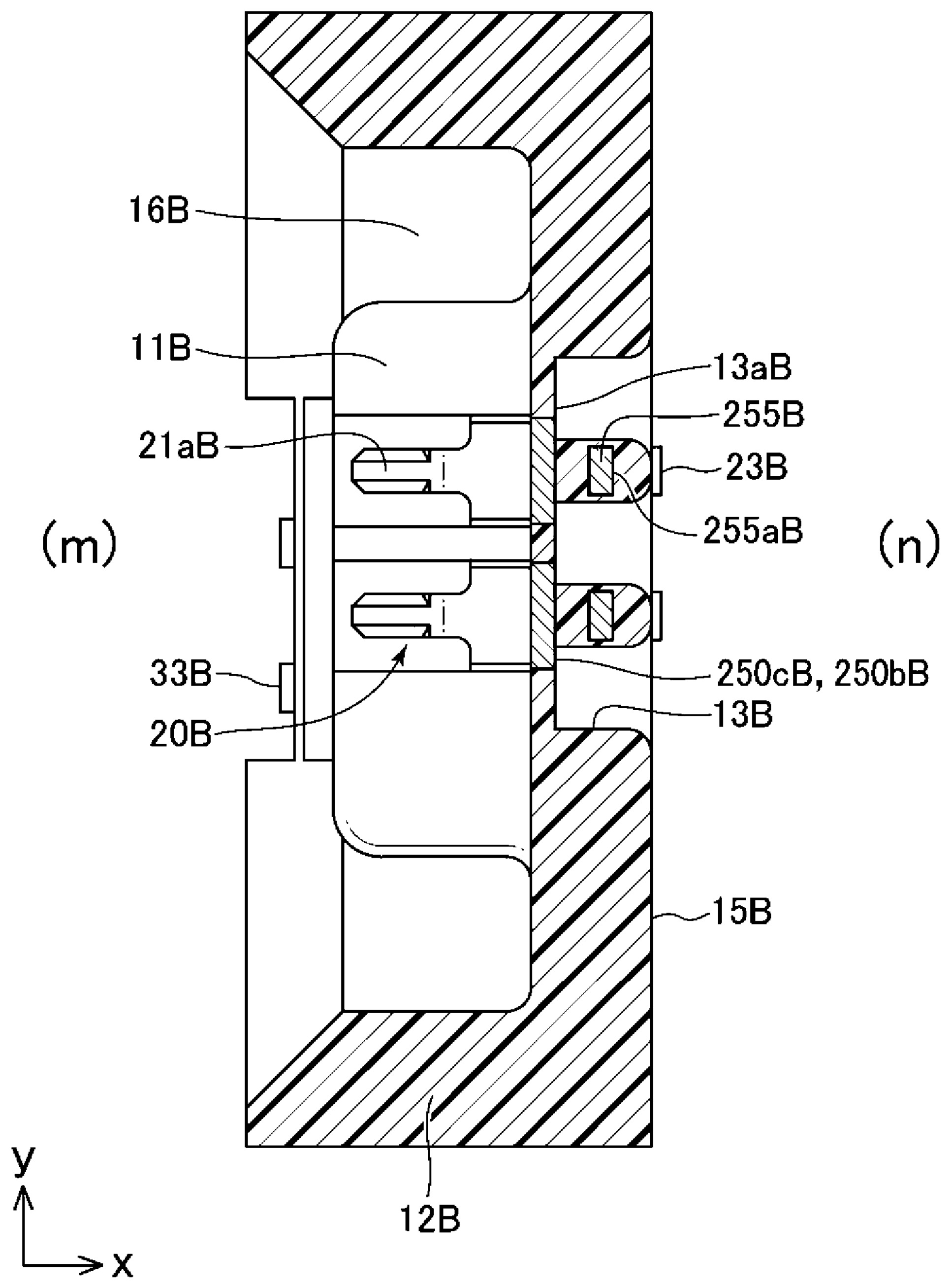
FIG. 17 is a cross-sectional view of the terminals according to the third embodiment, corresponding to the cross-sectional view along line B-B in FIG. 6 in the first embodiment.
Figure 18:
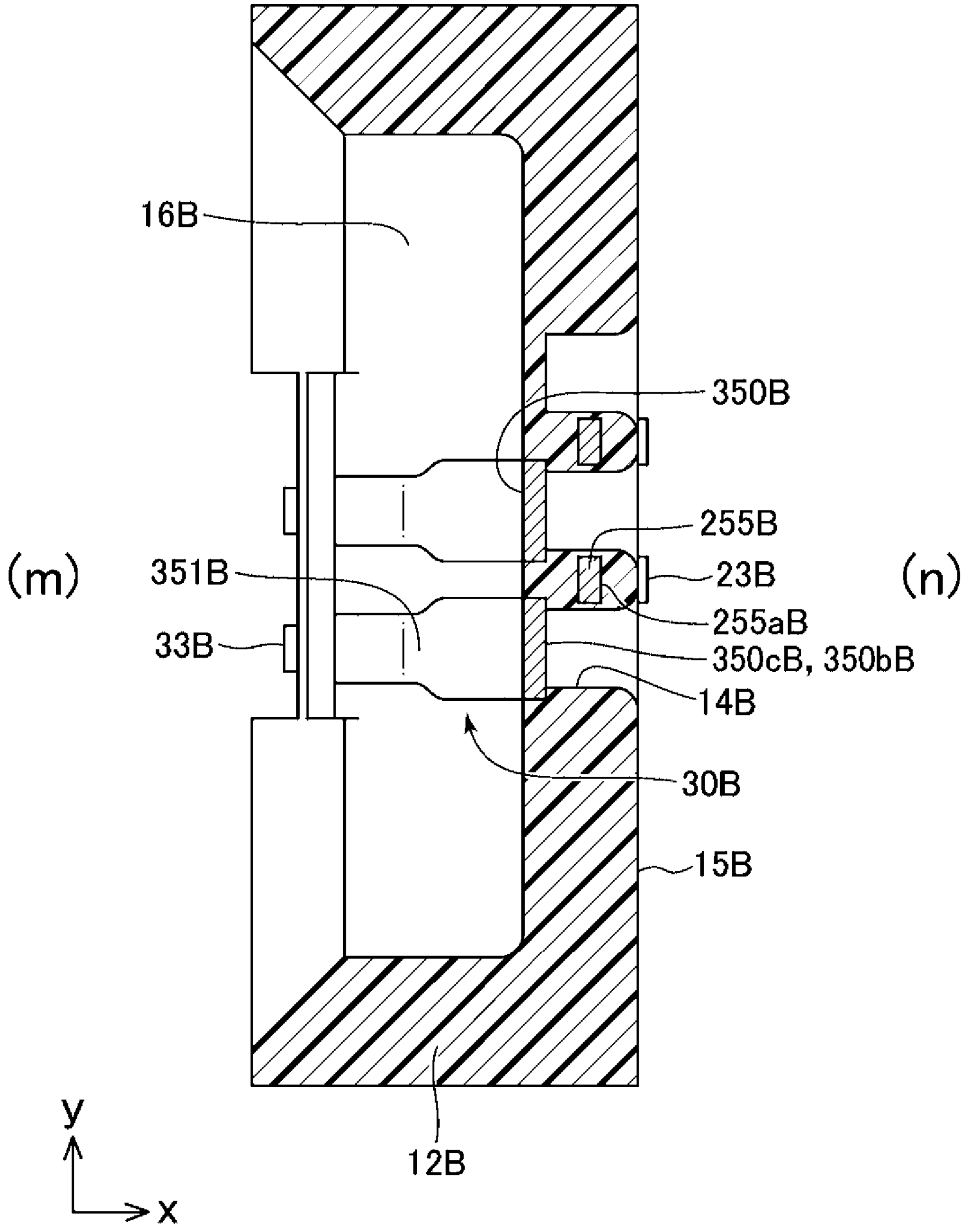
FIG. 18 is a cross-sectional view of the terminals according to the third embodiment, corresponding to the cross-sectional view along line C-C in FIG. 6 in the first embodiment.

FIGS. 14 and 15 illustrate a perspective view and a rear view of terminals, respectively. Moreover, FIGS. 16, 17, and 18 illustrate a cross-sectional view corresponding to the cross-sectional view along line A-A in FIG. 2 in the first embodiment, a cross-sectional view corresponding to the cross-sectional view along line B-B in FIG. 6 in the first embodiment, and a cross-sectional view corresponding to the cross-sectional view along line C-C in FIG. 6, respectively.

Terminals 20B and 30B in the third embodiment have the same configurations as the terminals 20 and 30 used in the first embodiment, respectively.

In the third embodiment, especially at least a part (350*b*B) of a first surface 350*a*B, which extends along the plane (the y-z plane) crossing the mating direction, of a first vertical portion 350B of the terminal 30B does not overlap a second vertical portion 255B as viewed in the direction (x) along the mating direction (refer to FIG. 15). As a result, at least a partial region 350*c*B (refer to, for example, FIG. 18) of the portion 350*b*B that does not overlap the second vertical portion 255B can be used to place a mold through a second opening 14B. The main difference from the first embodiment is the respect that, in the third embodiment, the partial region 350*c*B is provided as the region that is used to place a mold, by displacing the terminals 20B and 30B from each other at least on the plane (the y-z plane) crossing the mating direction (x1).

The present disclosure is not limited to the above-mentioned embodiments, and can be modified in various manners. For example, two types of the terminals 20 and 30 are used in the above-mentioned embodiments. However, the present disclosure is not limited to these two types. Especially, the terminal 20 includes the first vertical portion 250 (the first terminal portion) and the second vertical portion 255 (the second terminal portion), and therefore the present disclosure can be carried out by use of the terminals 20 alone as in, for example, the first embodiment.

Moreover, for example, it may be configured in such a manner that one of at least any two of a plurality of terminals includes the first terminal portion, and the other terminal includes the second terminal portion.

It is supposed that those skilled in the art in areas related to the present disclosure could have devised many altered modes or other embodiments of the present disclosure with the aid of the teaching illustrated in the above description. It is obvious that those skilled in the art can modify and alter the present disclosure without departing from the scope or gist of the present disclosure. Therefore, the present disclosure is not limited to the unique embodiments disclosed herein, and includes altered modes and other embodiments in the scope of the accompanying claims. The specific terms are used in the specification. However, the terms are not used to limit their definitions, and are simply used in general and descriptive sense.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A connector comprising:

a housing; and a plurality of terminals insert molded with the housing, wherein at least one of the plurality of terminals includes a first terminal portion, at least one of the plurality of terminals includes a second terminal portion spaced apart from the first terminal portion in a direction along a direction of mating to a counterpart connector, the first terminal portion is placed on a side nearer to a side that mates to the counterpart connector than the second terminal portion in the direction along the mating direction, the first terminal portion includes a first surface extending along a plane crossing the mating direction on a side opposite to the side that mates to the counterpart connector in the mating direction, the first surface includes a portion that does not overlap the second terminal portion as the first and second terminal portions are viewed in the direction along the mating direction from the side opposite to the side that mates to the counterpart connector in the mating direction, and at least a partial region of the portion, which does not overlap the second terminal portion, of the first surface is exposed to an outside of the housing through an opening of the housing.

2. The connector according to claim 1, wherein at least the partial region of the portion, which does not overlap the second terminal portion, of the first surface is provided by setting an area of the first surface larger than an area of the second terminal portion on the plane crossing the mating direction.

3. The connector according to claim 1, wherein at least the partial region of the portion, which does not overlap the second terminal portion, of the first surface is provided by displacing the first and second terminal portions from each other on the plane crossing the mating direction.

4. The connector according to claim 1, wherein upon each of at least any two of the plurality of terminals including the first or second terminal portion, at least the partial region is provided by displacing the any two terminals from each other on the plane crossing the mating direction.

5. The connector according to claim 1, wherein each of the plurality of terminals includes:

an elastic displacement portion having a contact capable of elastically coming into contact with a counterpart terminal of the counterpart connector; and a board mounted portion mounted on a board, each of the first and second terminal portions is provided between the elastic displacement portion and the board mounted portion, and the terminal is held by the housing in any of portions other than the elastic displacement portion and the board mounted portion.

6. The connector according to claim 1, wherein the connector is fixed to the board in such a manner that the mating direction is substantially parallel to a board surface of the board.

7. The connector according to claim 6, wherein contacts of at least any two of the plurality of terminals are placed in stages, spaced apart from each other in a vertical direction to the board surface of the board, the board mounted portion of one of the any two terminals that includes the first terminal portion is placed on the side nearer to the side that mates to the counterpart connector than the first terminal portion in the direction along the mating direction, and the board mounted portion of the other of the any two terminals that includes the second terminal portion is placed on a side farther from the side that mates to the counterpart connector than the second terminal portion in the direction along the mating direction.

8. A connector comprising:

a housing; and one terminal insert molded with the housing, wherein the terminal includes a first and a second terminal portion spaced apart from each other in a direction along a direction of mating to a counterpart connector, the first terminal portion is placed on a side nearer to a side that mates to the counterpart connector than the second terminal portion in the direction along the mating direction, the first terminal portion includes a first surface extending along a plane crossing the mating direction on a side opposite to the side that mates to the counterpart connector in the mating direction, the first surface includes a portion that does not overlap the second terminal portion as the first and second terminal portions are viewed in the direction along the mating direction from the side opposite to the side that mates to the counterpart connector in the mating direction, and at least a partial region of the portion, which does not overlap the second terminal portion, of the first surface is exposed to an outside of the housing through an opening of the housing.

* * * * *